United States Patent [19]
Kim

[11] Patent Number: 5,585,932
[45] Date of Patent: Dec. 17, 1996

[54] VIDEO INDEX SEARCH APPARATUS AND METHOD THEREFOR EMPLOYING AMPLITUDE-VARIABLE TRACKING SIGNALS

[75] Inventor: Chul-Hong Kim, Suwon, Rep. of Korea

[73] Assignee: Samsung Electrics Co., Ltd., Kyungki-do, Rep. of Korea

[21] Appl. No.: 89,517

[22] Filed: Jul. 21, 1993

[30] Foreign Application Priority Data

Jul. 21, 1992 [KR] Rep. of Korea ................ 1992-13003

[51] Int. Cl.⁶ ................................................ H04N 5/782
[52] U.S. Cl. ................................................ 386/69; 386/75
[58] Field of Search ................................ 358/335, 312, 358/320, 321, 323; 360/33.1, 72.1, 72.4, 10.1, 14.2, 73; H04N 5/782

[56] References Cited

U.S. PATENT DOCUMENTS

| | | | |
|---|---|---|---|
| 4,542,424 | 9/1985 | Ishihara | 360/73 |
| 4,604,656 | 8/1986 | Fujii | 358/312 |
| 4,954,911 | 9/1990 | Hirasawa | 358/323 |
| 5,046,167 | 9/1991 | Nakato et al. | 358/335 |
| 5,089,919 | 2/1992 | Kozuki et al. | 360/74.4 |
| 5,229,890 | 7/1993 | Okauchi | 360/14.2 |

FOREIGN PATENT DOCUMENTS 0213731  7/1986  European Pat. Off. .

Primary Examiner—Thai Q. Tran
Assistant Examiner—Huy Nguyen
Attorney, Agent, or Firm—Sughrue, Mion, Zinn, Macpeak & Seas

[57] ABSTRACT

A video index search control circuit for a cassette recorder utilizing 8 mm recording tape and performing tracking in response to four tracking signals of differing frequencies includes a tracking controller for controlling tracking in accordance with the tracking signals and a head for selectively recording and reproducing the tracking frequencies, a video signal and audio signal, an amplifier for varying amplitude of said tracking signals generated by said tracking controller to produce high amplitude tracking signals and a video index search system signal detector for sensing the high amplitude tracking signals and for producing a high voltage signal indicating the presence of the high amplitude tracking signals. A method for controlling a video index search function is also disclosed.

14 Claims, 4 Drawing Sheets

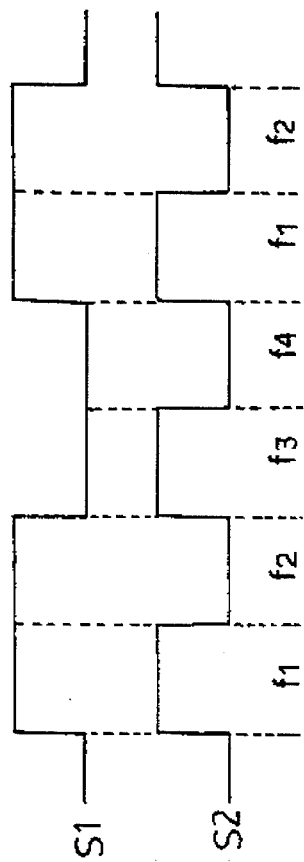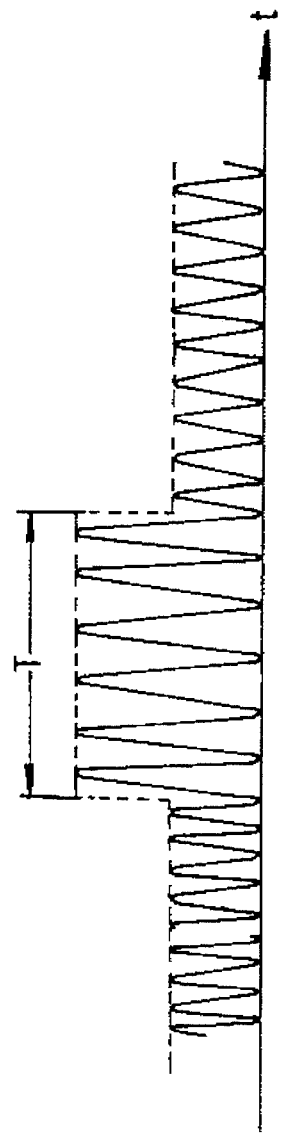

VIDEO INDEX SEARCH APPARATUS AND METHOD THEREFOR EMPLOYING AMPLITUDE-VARIABLE TRACKING SIGNALS

BACKGROUND OF THE INVENTION

1. Field of the Invention

The present invention relates to an 8 mm magnetic tape recorder and, more particularly, to circuitry for providing a Video Index Search System (VISS) in an 8 mm format video cassette recorder (VCR) by varying the amplitude of at least one of the frequencies used during recording and playback of an 8 mm magnetic tape. The present invention is equally applicable to camcorders utilizing an 8 mm recording tape format. A method for performing a VISS function is also disclosed.

Korean Patent Application No. 92-13003 is incorporated herein by reference for all purposes.

2. Description of the Prior Art

It is generally well-known that a control track can be formed on a lower end of a tape in order for a head to correctly trace a video track on a magnetic tape recorded by a video cassette recorder using a magnetic tape in the ½ inch (12.65 mm) format. In order to precisely control the position of a rotary head with respect to a recorded video signal, a control track has been formed on a lower end of a tape to thereby record a control signal. For ½ inch format magnetic tape, the VISS function has been performed by varying the duty cycle of the control signal. However, due to a narrow width of the 8 mm format magnetic tape, the control track cannot be formed on the lower end. Therefore, tracking is performed by utilizing a separate tracking frequency. More precisely, tracking is performed utilizing four tracking frequencies, f1–f4.

It will be appreciated that in order to perform the VISS function, an index signal must be recorded on a predetermined portion of the track domain.

In the prior art system discussed in EP 0 213 731 A1, entitled "Index Signal Detecting System," a description is provided for an index signal detecting system for detecting the index signal recorded on a predetermined track domain during a high speed reproduction mode. According to EP 0 213 731 A1, there is proposed a technique to detect the index signal at all times by way of a rotary head traversely running on the track during the high speed reproduction mode. However, because recording the index signal on a predetermined track domain amounts to, as seen in the foregoing, recording the index signal on a very limited portion of the track domain, it is difficult to detect the index signal during a high-speed search mode or a high-speed reproduction mode.

The present invention was motivated by a desire overcome these problems.

SUMMARY OF THE INVENTION

The principal purpose of the present invention is to provide an apparatus, and an associated method, to continuously detect a VISS signal. The apparatus and method advantageously can be used even during high-speed reproduction and high-speed search modes of operation.

Accordingly, it is an object of the present invention to provide a video index search apparatus and method therefor for performing a VISS function utilizing an amplitude variation of a tracking frequency utilized for 8 mm format video tapes.

These and other objects, features and advantages of the invention are provided by a video index search method for an 8 mm format video tape and VCR, the method comprising the steps of: recording a VISS signal by varying the amplitude of at least one tracking signal; and detecting the VISS signal by detecting variations in the at least one tracking signal recorded in the recording step.

These and other objects, features and advantages of the invention are provided by a video index search control system for a VCR employing 8 mm format recording tape, the system including a tracking controller for controlling the tracking in accordance with the tracking frequencies, a VISS signal generator for varying the amplitudes of the tracking frequencies generated by the tracking controller, a head for recording and reproducing tracking frequencies with amplitudes varied by the VISS signal generator, a video signal and an audio signal on an 8 mm format magnetic tape and a VISS signal detector for sensing variations in the tracking frequency amplitudes for the VISS function from other signals reproduced from the head.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIG. 2 are illustrations of control signals useful for explaining generation of a tracking control signal used in the circuitry of FIG. 1;

FIG. 3 is a waveform diagram illustrating the variation of a tracking control signal in accordance with a VISS function in the circuitry illustrated in FIG. 1.

DETAILED DESCRIPTION OF THE INVENTION

Figure 1:
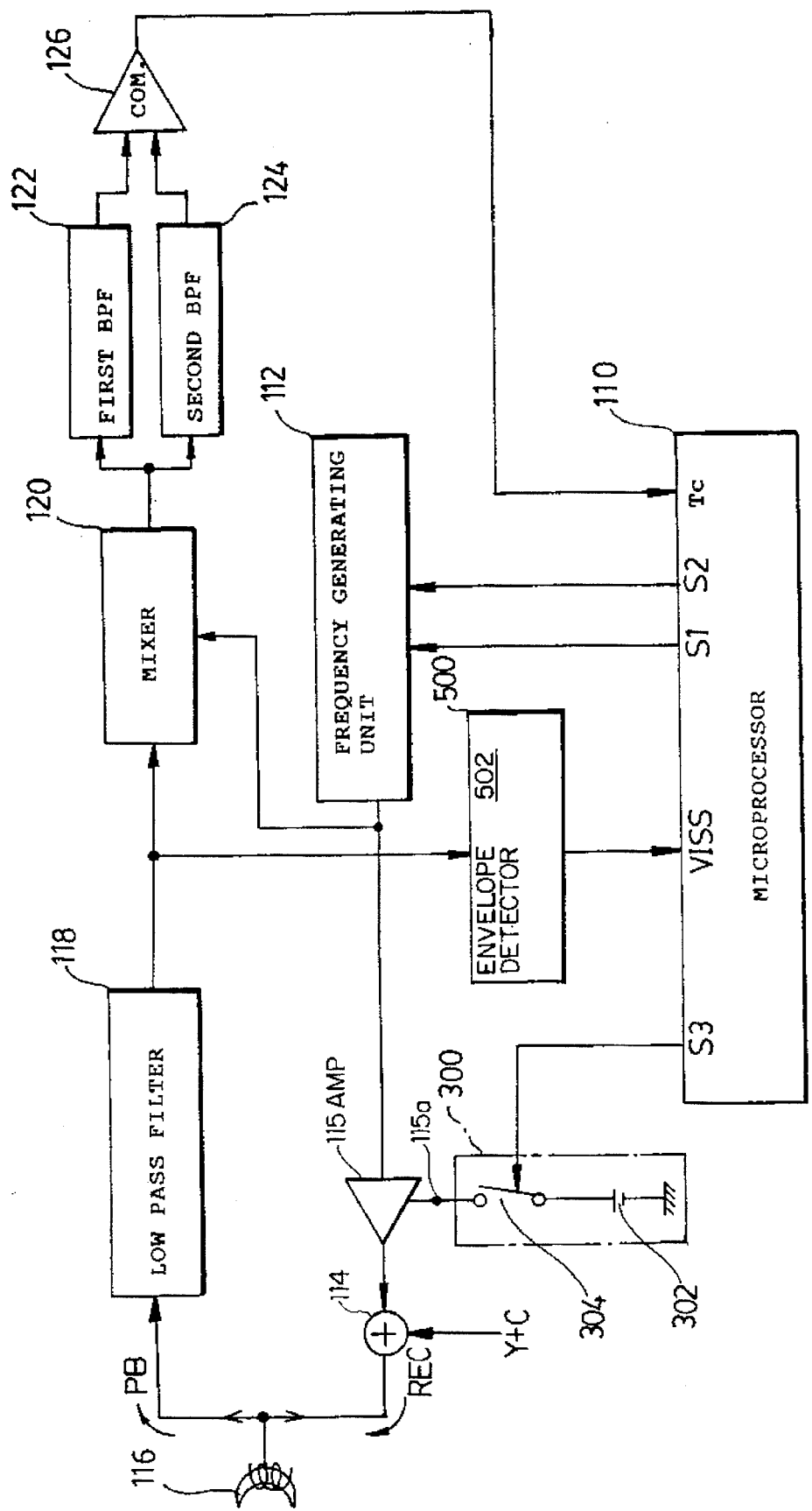
FIG. 1 is a block diagram illustrating a preferred embodiment of a video index search apparatus for recording and reproducing video tape using the 8 mm format in accordance with the present invention.

FIG. 1 is a block diagram illustrating one preferred embodiment of a video index search system (VISS) 10 for an 8 mm format recording tape in accordance with the present invention. In FIG. 1, VISS 10 includes a tracking control circuit for controlling the tracking in accordance with a plurality of tracking frequencies, a VISS signal generator 300 for generating a control signal for varying the amplitudes of the tracking frequencies generated by the tracking control circuit, a head 116 for recording and reproducing, with respect to an 8 mm magnetic tape, selected ones of the tracking frequencies with amplitudes varied in response to the VISS signal generator 300, a video signal and an audio signal and a VISS signal detector 500 for sensing variations in the tracking frequency amplitudes indicative of the VISS function from the signals reproduced from the head 116.

More specifically, the tracking control circuit includes a frequency generator 112 for generating four different tracking frequencies f1–f4, which are repeatedly and continuously generated in accordance with tracking control signals S1 and S2 output from a microprocessor 110 and an amplifier 115 connected between the output of frequency generator 112 and an adder 114 for varying the amplitude of tracking frequencies f1–f4 produced by frequency generator 112 in response to at least one control signal provided by VISS signal generator 300. In the tracking control circuit, adder 114 permits the adding of the tracking frequencies f1–f4 generated by the frequency generator 112 to selected ones of video signal (Y+C) and audio signal. A head 116 for recording and reproducing on a magnetic tape the tracking frequencies f1–f4, the video signal (Y+C) and audio signal added by adder 114, a low pass filter 118 for detecting the tracking frequencies f1–f4 from all signals output by head 116, a mixer 120 for extracting a difference between the tracking frequencies f1–f4 detected from the low pass filter 118 and the tracking frequencies f1–f4 generated from the frequency generator 112, first and second band pass filters (BPFs) 122 and 124 for generating a predetermined domain out of all frequencies output by mixer 120 and a comparator 126 for generating respectively different voltage levels in accordance with the frequencies output from the first and second BPFs are all advantageously included in the tracking control circuit. A microprocessor 110 for controlling the tracking in accordance with the voltage levels generated by comparator 126 advantageously can be included in the tracking control circuit.

It will be appreciated that the tracking frequencies f1–f4 are low frequencies having no influence on a chrominance signal in the low frequency domain. Furthermore, it will be noted that the difference in the tracking frequencies f1–f4 output from the mixer 120 is either approximately 16 KHz or 46 KHz. Preferably, the first and second BPFS 122 and 124 pass frequencies if the 16 KHz and 46 KHz ranges, respectively.

The VISS signal generator 300 includes a voltage source 302 for generating a predetermined voltage and a switch 304 for applying the predetermined voltage to a control terminal 115a of amplifier 115 so as to varying the amplitudes of the tracking frequencies f1–f4 output by frequency generator 112 during a predetermined period of time T. Preferably, a VISS control signal S3 is output by microprocessor 110 to thereby produce selected application of the voltage from voltage source 302 by means of switch 304. It will be appreciated that variations on the above-described circuitry, e.g., supplying signal S3 directly to a control terminal 115a' (not shown) of amplifier 115, can be made without departing from the spirit and scope of the present invention.

VISS signal detector 500 includes an envelope detector 502 for sensing the amplitude variations indicative of the VISS function from the tracking frequencies f1–f4 output by low pass filter 118.

The operation of VISS 10 will now be described with respect to FIGS. 1–3 As will be appreciated from FIG. 1, the video signal (Y+C) is recorded on the magnetic tape via the adder 114 and the head 116. Preferably, microprocessor 110 simultaneously outputs the tracking signals S1 and S2, which are applied to frequency generator 112. The frequency generator 112 generates the respectively different tracking frequencies f1–f4 to thereby output the same in accordance with the tracking control signals S1 and S2 output from the microprocessor, as illustrated in FIG. 2.

Those of ordinary skill in the art will note that the respectively different tracking signals are f1=102.54 KHz, f2 =118.95 KHz, f3=165.21 KHz and f4=148.69 KHz. These tracking frequencies f1–f4 are recorded on the magnetic tape by the head 116, being added to the video signal (Y+C) at the adder 114.

During reproduction, the tracking frequencies f1–f4 recorded on the magnetic tape and the video signal (Y+C) are reproduced by the head 116 and are supplied to low pass filter 118, which passes only the tracking frequencies f1–f4 out of all of the reproduced signals. Preferably, the signals reproduced by the head 116 are input to the low pass filter 118 and simultaneously input to signal processing circuitry (not shown) to thereby process the video signal (Y+C).

The tracking frequencies f1–f4 which have passed the low pass filter 118 are input to the mixer 120, which obtains a difference between the reproduced tracking frequencies f1–f4 which have passed the low pass filter 118 and the tracking frequencies f1–f4 generated from the frequency generator 112.

It will be appreciated that if the head 116 is biasedly positioned on a regular track, a tracking signal of another frequency is reproduced to thereby generate a difference frequency using a heterodyne technique, and, in accordance with a bias direction of the track, the difference frequency becomes either approximately 16 KHz or 46 KHz.

The first BPF 122 and the second BPF 124 are filters which pass 16 KHz and 46 KHz bands, and according to a bias direction of the head, the signal of 16 KHz or 46 KHz frequency band output from the mixer 120 is passed by one of these filters. Comparator 126 outputs respectively different voltage levels in accordance with the outputs of the first and second BPFS 122 and 124. The voltage levels output from the comparator 126 are tracking control signals which are advantageously input to microprocessor 110, which recognizes a bias of the head from the track in accordance with the input tracking control signals to thereby perform the tracking.

When a user operates a relevant button (or switch) in order to execute the VISS function, the microprocessor 110 outputs a VISS control signal S3 for a predetermined period of time T. Switch 304 of the VISS signal generator 300 is thus activated by the VISS control signal S3 output during the predetermined period of time T. If the switch 304 is ON, a control voltage generated from the voltage source 302 is applied to terminal 115a of amplifier 115 to amplify the tracking frequencies f1–f4 produced by frequency generator 112. Accordingly, the amplitudes of the tracking frequencies f1–f4 generated by the frequency generator 112 are increased for the predetermined period of time T, as illustrated in FIG. 3. Preferably, the tracking frequencies f1–f4 with increased amplitudes during time period T are recorded on the magnetic tape by the head 116 via the adder 114.

Thus, when the user executes the VISS function in order to seek a specific portion of the magnetic tape (the portion where the amplitude of the tracking frequency is increased by the selection of the VISS function), the signals recorded on the magnetic tape by the head 116 are reproduced and are provided to low pass filter 118. As previously mentioned, the low pass filter 118 passes only the tracking frequencies f1–f4 out of all the signals reproduced by the head 116. The tracking frequencies f1–f4 which have passed the low pass filter 118 are simultaneously input to the mixer 120, to perform tracking as explained in detail above, and to envelope detector 502. Envelope detector 502 detects an envelope in accordance with the amplitudes of the input tracking frequencies f1–f4 and outputs corresponding direct voltages.

Accordingly, when the tracking frequencies, the amplitudes of which have been increased by selection of the VISS function, are reproduced, the envelope detector 502 outputs significantly higher voltage levels. When these higher voltage levels are subsequently input to a VISS terminal, the microprocessor 110 recognizes the signal output to the mixer 120 and envelope detector 502 as a specific portion of the magnetic tape.

It will be noted that the high amplitude tracking signals are applied as the tracking frequencies for a predetermined period of time T to prevent any roughness during the operation of the head 116 from producing a situation where the head 116 cannot reproduce the varied amplitudes of the tracking frequencies during high speed running of the tape, e.g., during a high speed search or a high speed rewind search.

Figure 4A:
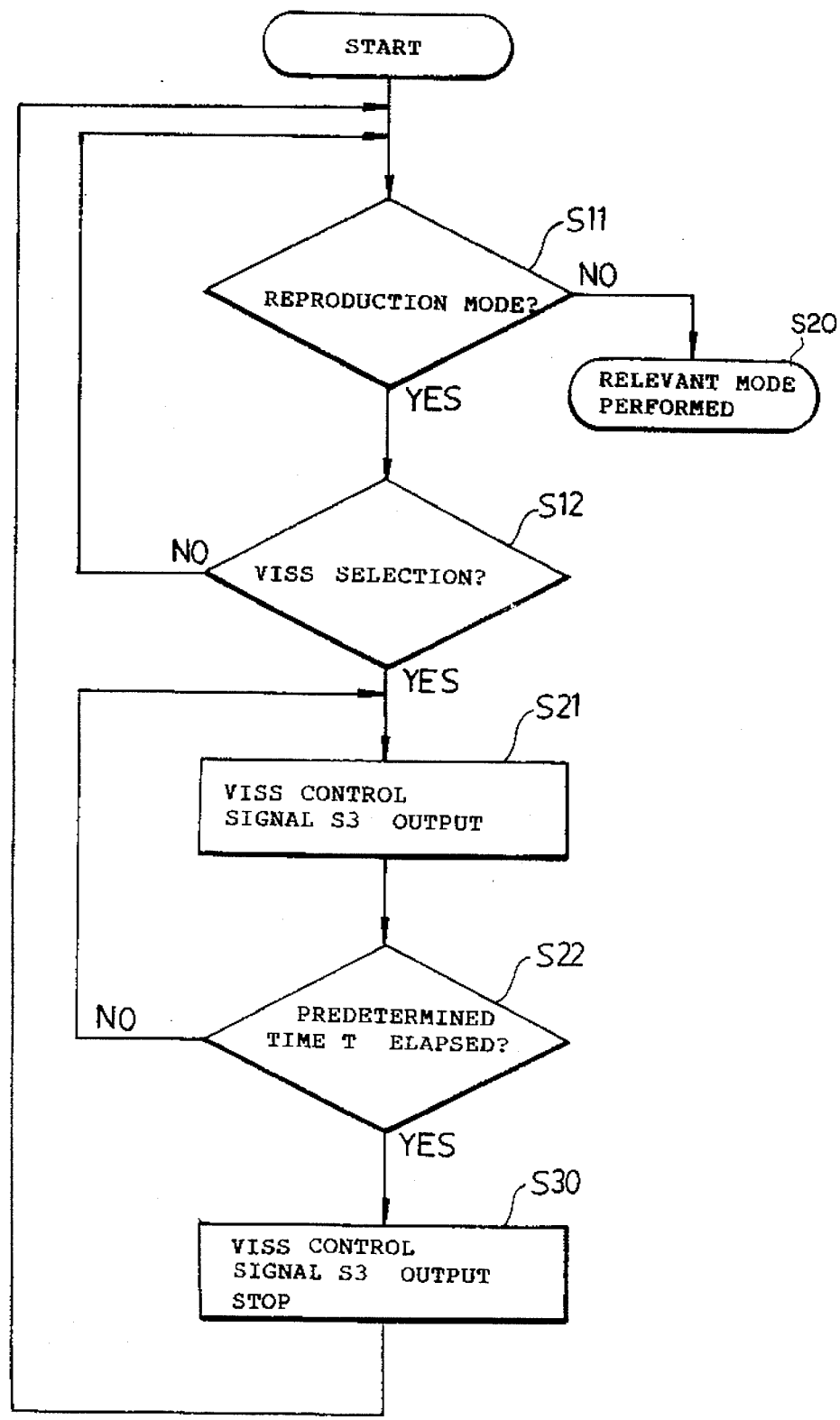
FIG. 4A and 4B are flow charts for explaining a video index search method for an 8 mm formatted recording tape in accordance with the present invention.
Figure 4B:
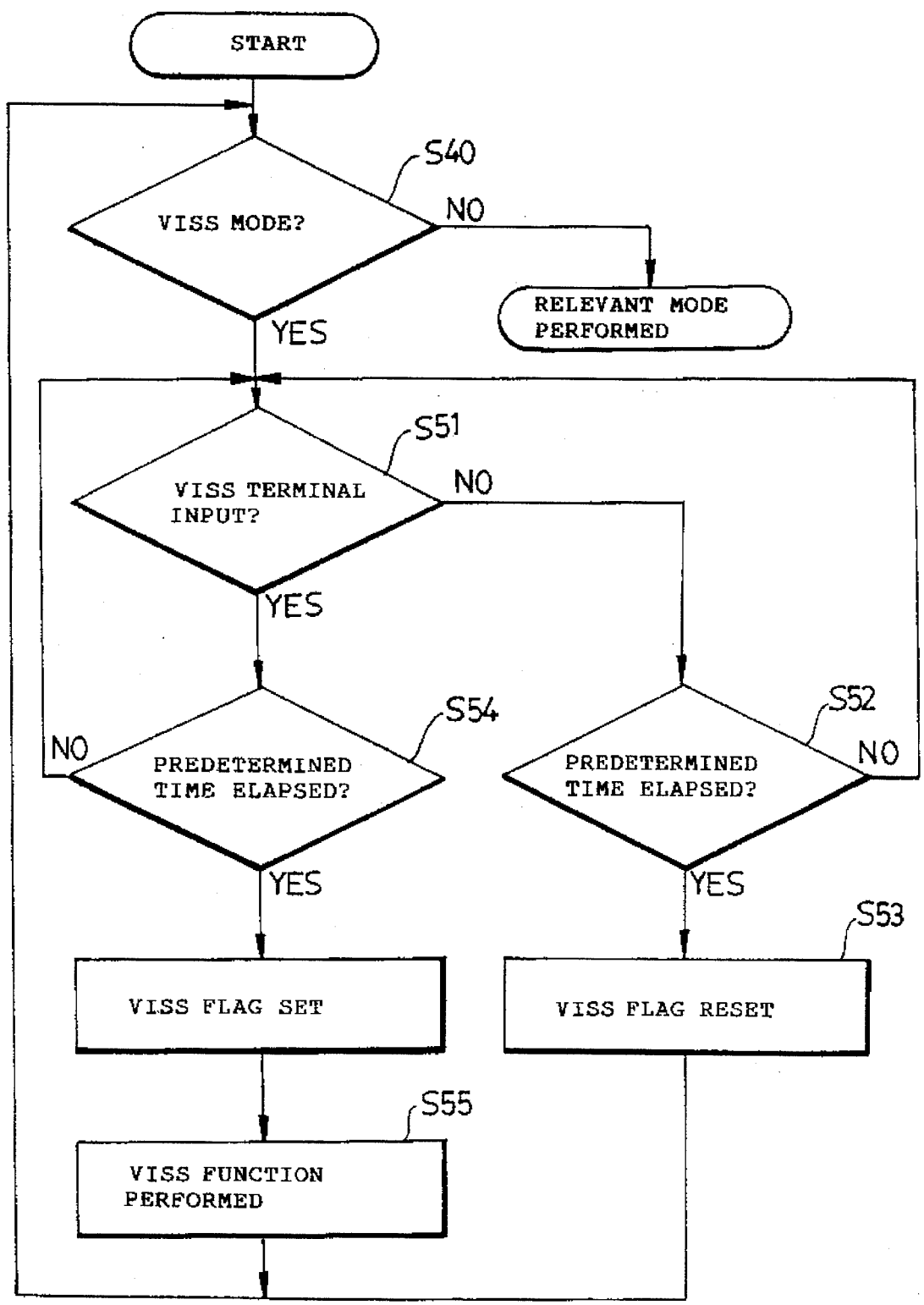

FIG. 4A and 4B are flow charts for explaining a video index search method of an 8 mm format in accordance with the present invention. Preferably, the method includes the steps of recording a VISS signal by varying an amplitude of at least one of the tracking frequencies and detecting the VISS signal by detecting variations in the tracking frequencies recorded in the recording step. FIG. 4A is a flow chart illustrating recording and FIG. 4B is a flow chart depicting reproducing.

Referring to FIG. 4A, the microprocessor 110 first determines whether a reproducing mode has been established during Step S11. If the reproducing mode has not been established, the relevant mode selected by the user is performed during Step S20. However, if the reproducing mode has been established, the microprocessor 110 determines whether the VISS function has been selected by the user during Step S12. Thus, when the VISS function is selected by the user, the microprocessor 110 outputs the VISS control signal S3 during Step S21. In other words, when the user operates a relevant button (or switch) in order to perform the VISS function, the microprocessor 110 responds by generating the VISS signal S3 for the predetermined period of time T.

The tracking frequencies are then amplified in response to the VISS control signal S3 output by the microprocessor 110. The amplitudes of the tracking frequencies advantageously are increased in response to signal S3. The amplitude-increased tracking frequencies are preferably recorded on the magnetic tape by the head 116. As previously noted, the VISS control signal S3 output by the microprocessor 110 is output for a predetermined period of time T during Step S22. When the predetermined period of time T has elapsed, the output of VISS control signal S3 is stopped during Step S30.

It will again be noted that the high amplitude tracking signals are applied as the tracking frequencies for a predetermined period of time T to prevent any roughness during the operation of the head 116 from producing a situation where the head 116 cannot reproduce the varied amplitudes of the tracking frequencies during high speed running of the tape, e.g., during a high speed search or a high speed rewind search. In other words, the amplifier 115 generates high amplitude tracking frequencies for a predetermined period of time and the predetermined period of time is sufficiently long to permit the signal detector 500 to sense the high amplitude tracking signals during a high speed running operation involving the recording tape.

In FIG. 4B, the microprocessor 110 determines whether the VISS mode has been established at Step S40. If the VISS mode has not been established, the relevant mode selected by the user is performed during Step S41. If, however, the VISS mode has been established, the microprocessor 110 determines whether a high voltage signal has been input to the VISS terminal during Step S51. In other words, if the user selects the VISS function in order to seek a specific portion of the recording tape (the portion where the amplitude-increased tracking frequencies are recorded in response to selection by the user), the microprocessor 110 determines whether the high voltage signal has been input to the VISS terminal. Preferably, the output of the envelope detector 502, which detects the envelope of the tracking frequencies to thereby output the results as voltage levels, is input to the VISS terminal of the microprocessor 110. In response, microprocessor 110 resets a VISS flag during Step S53 if the high voltage signal has not been input to the VISS terminal for the predetermined period of time T during Step S52.

If the high voltage signal is input to the VISS terminal for the time T during Step S54, the VISS flag is set during Step S55 to thereby perform the VISS function.

As seen from the foregoing, the video index search apparatus for an 8 mm format in accordance with the present invention performs the VISS function by utilizing the tracking frequencies f1–f4 to thereby eliminate the need for a separate recording domain and, at the same time, to obtain an effect that does not necessitate separate circuitry for preventing erroneous operations even when the tape is running at a high speed, e.g., during high speed search and the like.

The foregoing description and drawings are illustrative and are not taken as limiting. Still other variations and modifications are possible without departing from the spirit and the scope of the present invention.

Specifically, in the foregoing description, an explanation has been given on amplitude variation of the tracking frequency. It will be noted that the present invention advantageously may be effected by those skilled in the art utilizing other signals.

Furthermore, the present invention was only described with respect to performance of the VISS function by increasing the amplitudes of the tracking frequencies for a predetermined period of time. It will be readily appreciated that the present invention can be practiced by reducing the amplitudes of frequencies f1–f4 or by intermittently generating the VISS control signal output by the microprocessor for a predetermined period of time, so that the voltage level detected by the envelope detector 502 can be expressed in repeated pulses for a predetermined period of time.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A video index search method for a video cassette recorder utilizing recording tape in 8 mm format, whereby tracking is provided in response to four tracking signals of differing frequencies, said method comprising the steps of:

(a) recording a video index search system (VISS) signal by varying amplitudes of the tracking signals; and (b) detecting the VISS signal by detecting respective variations in said amplitudes of the tracking signals recorded in the recording step.

2. The video index search method as defined in claim 1, wherein step (a) comprises the steps of:

(c) determining whether or not a VISS function has been selected during a reproducing mode of operation; and (d) generating the VISS control signal for a predetermined period of time to thereby vary the amplitudes of said frequencies of respective tracking signals.

3. The video index search method as defined in claim 2, wherein the predetermined period of time for generating the video index search system control signal is greater than or equal to a detection period necessary for detecting the VISS signal even during a high speed running of said recording tape.

4. The video index search method as defined in claim 1, wherein said step (a) comprises the step of (e) amplifying the tracking signals so as to varying the amplitude of said frequencies of respective tracking signals.

5. The video index search method as defined in claim 1, wherein said step (b) comprises the steps of:

(f) determining whether or not a video index search system mode has been established; and (g) performing a video index search system function when the video index search system signal is input by varying the amplitudes of the frequencies of respective tracking signals for a predetermined period of time during the video index search system mode.

6. A video index search control circuit for a cassette recorder utilizing recording tape in 8 mm format whereby tracking is provided in response to four tracking signals of differing frequencies, said control circuit comprising:

a tracking control circuit controlling tracking in accordance with said tracking signals;

a video index search system (VISS) signal generator for varying respective amplitudes of the tracking signals generated by the tracking control circuit;

a head for selectively recording and reproducing on a magnetic tape of 8 mm format the tracking signals with respective said amplitudes varied by the VISS signal generator, a video signal and an audio signal; and a VISS signal detector for sensing variations in said tracking signals indicative of changes in amplitude out of all signals reproduced by the head.

7. The video index search control circuit as defined in claim 6, wherein the VISS signal generator comprises:

a voltage source for generating a predetermined voltage; and a switch for applying said predetermined voltage so as to permit varying of said tracking signals generated by the VISS signal generator for a predetermined period of time.

8. The video index search control circuit as defined in claim 7, wherein said predetermined period of time permits said VISS signal detector to detect the variations in said tracking signals during high speed running of the recording tape.

9. The video index search control circuit as defined in claim 6, wherein said VISS signal detector comprises an envelope detector receiving said tracking signals for detecting said variations in said tracking signals.

10. The video index search control circuit as defined in claim 6, wherein the VISS signal generator comprises: an amplifier receiving said tracking signals from a frequency generator for generating said tracking signals having a first amplitude in response to a control signal provided by a microprocessor and for generating said tracking signals having a second amplitude when said control signal is not supplied, wherein said first amplitude is greater than said second amplitude.

11. A video index search control circuit for a cassette recorder utilizing recording tape in 8 mm format whereby tracking is performed in response to four tracking signals of differing frequencies, said control circuit including a tracking controller for generating the tracking signals and a head for selectively recording and reproducing on an 8 mm format recording tape the frequencies of respective tracking signals, a video signal and audio signal, said control circuit comprising:

an amplifier for varying amplitude of said tracking signals which are to be recorded and which have been generated by said tracking controller to produce a video index search system (VISS) signal of high amplitude tracking signals; and a detector for sensing said video index search system (VISS) and signal for producing a high voltage signal indicative thereof.

12. The video index search control circuit as defined in claim 11, further comprising:

a voltage source for generating a predetermined voltage; and a switch for applying said predetermined voltage to said amplifier so as to produce said high amplitude tracking signals.

13. The video index search control circuit as defined in claim 11, wherein said amplifier generates said high amplitude tracking signals for a predetermined period of time, said predetermined period of time being sufficiently long to permit said signal detector to sense said high amplitude tracking signals during a high speed running of the recording tape.

14. The video index search control circuit as defined in claim 11, wherein said signal detector comprises an envelope detector receiving said tracking signals for detecting said high amplitude tracking signals.

\* \* \* \* \*